United States Patent [19]

Yoshioka et al.

[11] Patent Number: 4,916,553
[45] Date of Patent: Apr. 10, 1990

[54] VIDEO SIGNAL RECORDING AND REPRODUCING METHOD AND APPARATUS

[75] Inventors: Atsushi Yoshioka, Katsuta; Takashi Furuhata, Yokoham; Hitoaki Owashi, Yokohama; Katsuo Mouri, Yokosuka, all of Japan

[73] Assignee: Hitachi, Ltd., Tokyo, Japan

[21] Appl. No.: 170,119

[22] Filed: Mar. 15, 1988

Related U.S. Application Data

[63] Continuation of Ser. No. 753,609, Jul. 10, 1985, abandoned.

[30] Foreign Application Priority Data

Jul. 20, 1984 [JP] Japan ............................ 59-149483
Jan. 18, 1985 [JP] Japan ................................ 60-5685

[51] Int. Cl.$^4$ ........................................... H04N 5/92
[52] U.S. Cl. ....................... 360/9.1; 360/19.1; 360/36.2; 358/339; 358/343
[58] Field of Search ............... 358/335, 337, 339, 341, 358/343; 360/9.1, 18, 19.1, 22, 32, 33.1, 36.1, 36.2, 37.1

[56] References Cited

U.S. PATENT DOCUMENTS

| | | | |
|---|---|---|---|
| 4,222,078 | 9/1980 | Bock . | |
| 4,297,733 | 10/1981 | Sanderson | 360/70 |
| 4,330,795 | 5/1982 | Foerster | 360/33.1 |
| 4,353,098 | 10/1982 | Heinz | 360/19.1 |
| 4,442,461 | 4/1984 | Shirai et al. | 358/343 |
| 4,468,710 | 8/1984 | Hashimoto et al. | 360/19.1 X |
| 4,479,150 | 10/1984 | Ilmer et al. | 358/343 X |
| 4,509,082 | 4/1985 | Kroner | 360/37.1 |
| 4,541,020 | 9/1985 | Kimura | 360/22 |
| 4,547,816 | 10/1985 | Sochor | 360/19.1 |
| 4,549,229 | 10/1985 | Nakoni | 360/19.1 |
| 4,558,378 | 12/1985 | Shibata | 360/19.1 |
| 4,563,710 | 1/1986 | Baldwin | 360/9.1 |
| 4,611,250 | 9/1986 | Yoshinaka et al. | |
| 4,613,912 | 9/1986 | Shibata et al. | 358/343 X |
| 4,614,980 | 9/1986 | Ninomiya et al. | |
| 4,677,464 | 6/1987 | Yamaji et al. | |
| 4,766,505 | 8/1988 | Nakano et al. | 358/343 X |

FOREIGN PATENT DOCUMENTS

2914830 1/1980 Fed. Rep. of Germany .
58-124382 2/1983 Japan .

OTHER PUBLICATIONS

"HD-TV Broadcasting System Using Single Channel Satellite", by Ninomiya, Mar., 1984.
VTR Techniques, by Japan Broadcasting Publishing Association, Mar., 1984.

*Primary Examiner*—Steven L. Stephan
*Assistant Examiner*—W. R. Young
*Attorney, Agent, or Firm*—Fay, Sharpe, Beall, Fagan, Minnich & McKee

[57] ABSTRACT

In a rotary magnetic head helical scan type video tape recorder using a segment recording system, a video signal of one vertical scanning period is divided into n video signal blocks, where n is an integer equal to or larger than 2, and a redundant period having a selected length is inserted into the video signal blocks in a recording mode. Each of the video signal blocks has a number of horizontal scanning lines equal or smaller than N/n, where N is the number of the horizontal scanning lines in a field of the video signal. In a reproducing mode, a time axis error of reproduced series of the video signal blocks is corrected at least during the redunant periods. Then, the corrected blocks are converted into the original video signal.

57 Claims, 12 Drawing Sheets

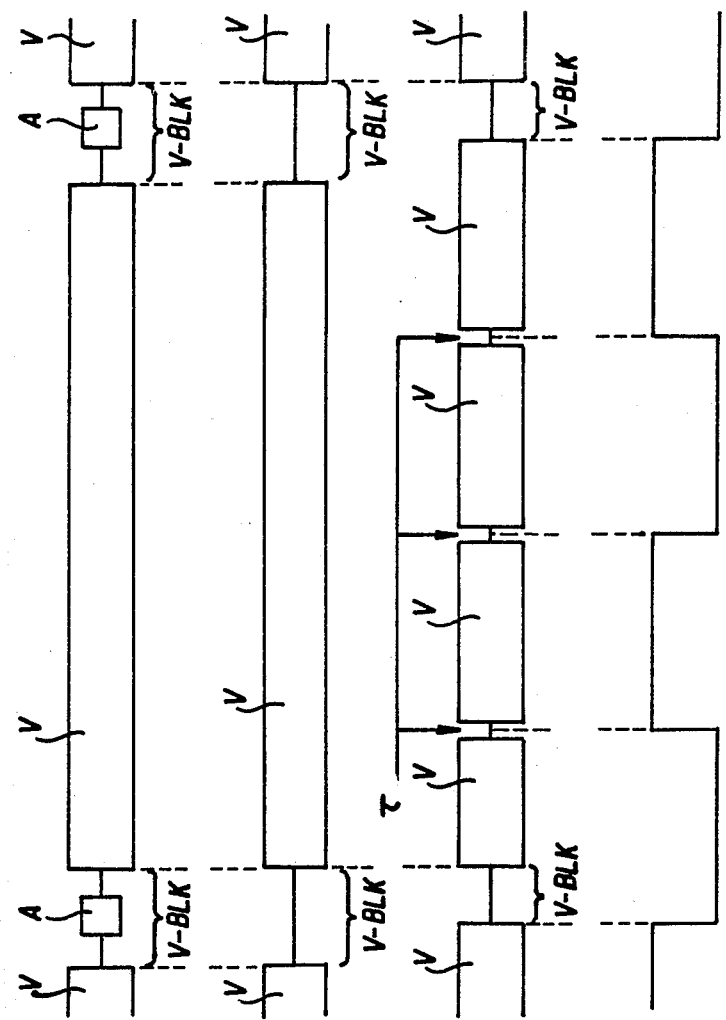

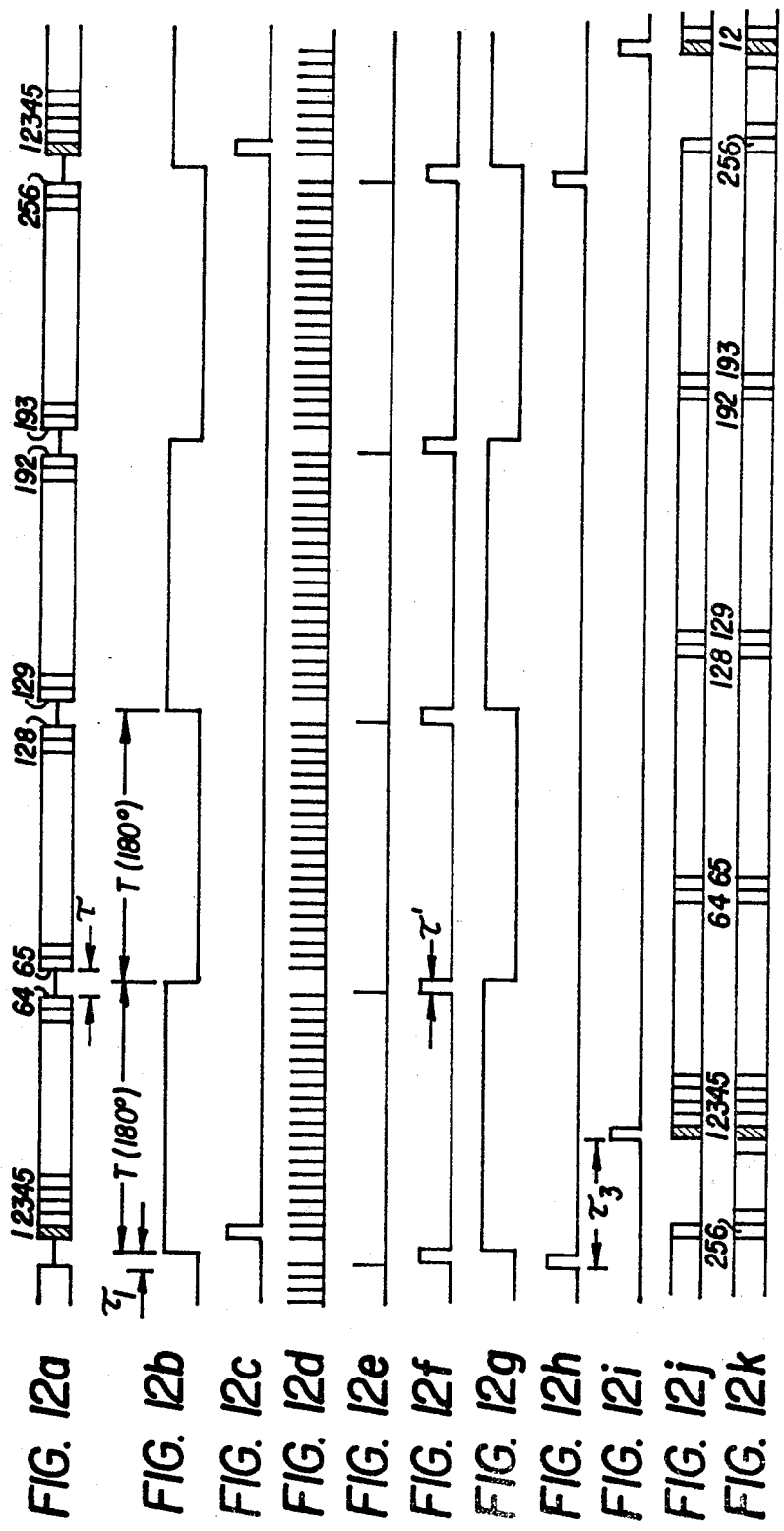

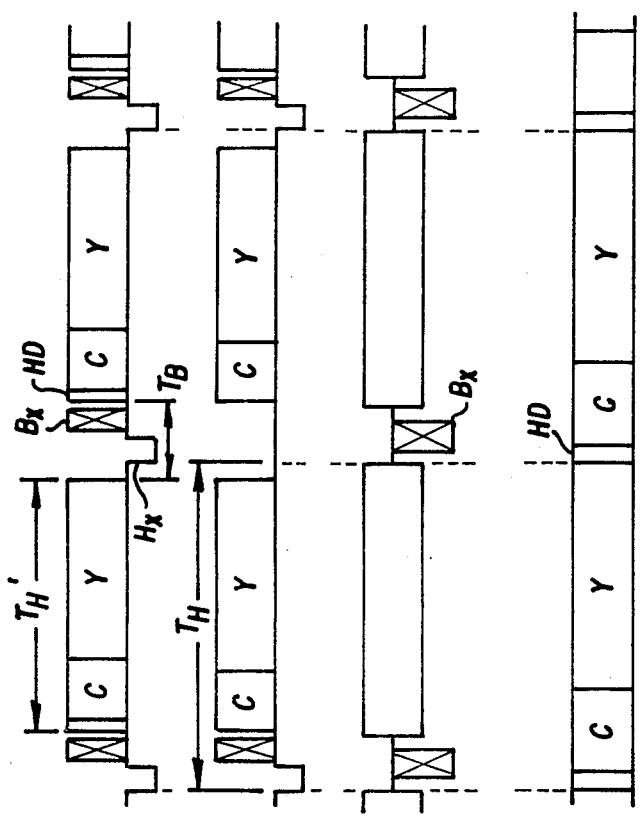

VIDEO SIGNAL RECORDING AND REPRODUCING METHOD AND APPARATUS

This application is a continuation of application Ser. No. 753,609, filed July 10, 1985, now abandoned.

BACKGROUND OF THE INVENTION

This invention relates to a magnetic video signal recording and reproducing method and apparatus, especially a video signal segment recording and reproducing method and apparatus.

A high-quality television system having a far greater resolution than the NTSC and PAL television systems is being developed. Since the development aims to increase vertical and horizontal resolution to twice that of the present level, the bands of luminance or brightness signals (Y), and chrominance or chromaticity signals (C), may be as broad as 30 MHz. To transmit those signals within a band as narrow as possible, about 8 MHz, an offset sampling method has been proposed between scanning lines and frames. The offset sampling method is detailed in the Technical Report of the Television Society of Japan, TEBS 95-2, March, 1984.

A rotary head helical scanning video tape recorder (hereinafter, VTR) which records and reproduces those video signals causes problems. If the band 8 MHz is to be recorded and reproduced with small apparatus VTRs, it must, because of the limitation of the diameter of a cylinder mounting the rotary heads, adopt a "segment recording system".

There is a four-head VTR known in the broadcasting industry as the "segment recording magnetic video recording and reproducing apparatus" in which video signals are recorded on a magnetic tape by having one vertical scanning period (i.e., one field) divided into a plurality of periods. This VTR is disclosed in detail in papers such as "VTR Techniques" (edited by the Japan Broadcasting Publishing Association and the Television Institute under the supervision of Minoru Inazu and Takashi Iwasawa). Since the video signal is recorded by dividing one field into a plurality of tracks, it is essential to provide the segment recording type VTR with a time-axis correcting circuit for correcting "skew" (abrupt changes in the time axis) when the tracks are changed in a reproducing mode. "Skew" may be caused by such common problems as inaccurately mounted rotary heads or by stretching or shrinking of the magnetic tape. One skew correcting method, known in the prior art has a time-axis correcting method in which reproduced video signals are fed through variable delay lines or the like, so that their delay time varies with the extent of skew. The phases of the reproduced video signals and their horizontal synchronizing signals may be made continuous by lengthening or shortening the horizontal blanking period of the video signals or, more commonly, by changing the period of a "front porch" occurring immediately before the horizontal synchronizing signals by the extent of skew, as is detailed in the above-specified papers (especially Section 7).

In the prior segment recording art described above, the correctable skew is limited by the time width of the front porch of the video signals and is restricted to about one to two microseconds in the television systems.

In contrast, home VTRs do not use the segment recording described above; home VTRs usually employ "helical scanning", in which one field of video signals is recorded on one track. Lately the segment recording described above has been tested with home VTRs. The aim is to reduce the diameter of a rotary drum, thereby further reducing the size and weight of the VTR; to increase the rate of revolution of the rotary drum, thereby improving the picture quality; and to realize a new VTR which can record video signals having a band several times as wide as that of the prior art, for example, about 8 MHz, as in the "high-quality television" having far higher fineness and picture quality than those of the conventional television system. In the helical scanning home VTRs, however, the tolerance of a mechanical system such as a rotary head system or a tape drive system may be quite wide due to limitations imposed by production requirements; hence, the extent of skew may increase to several microseconds. If compatibility or interchangeability is taken into consideration, it becomes still more necessary to estimate the tolerance.

With the partially proposed high-quality television, on the other hand, the horizontal blanking period to be assigned to the video signals is short (e.g., one microsecond or shorter), as is disclosed in papers such as the Technical Report of the Television Society of Japan (VOL. 7, No. 44, March, 1984, "Satellite One-Channel Transmission System MUSE of High-Quality Television").

If the amount of the skew in the home VTRs is considered, therefore, in either the conventional segment recording method, or either the existing television system or the proposed high-quality television system, it has been found quite difficult to completely eliminate the skew thereby to devise a new VTR capable of achieving the aforementioned purpose in practical use.

Another example of the prior art resorting to the segment recording, is a "digital VTR", in which analog video signals are converted into digital signals and recorded as PCM signals, for example, as shown in U.S. Pat. No. 4,330,795. From the necessity for reducing the quantum error accompanying the digitalization of the video signals, the number of quantum bits is increased to dramatically raise the transmission rate of the PCM signals to be recorded in the magnetic tape so that the recording density of the tape is so reduced as to make it difficult to have sufficient recording time. Moreover, the signals occupy such a wide band as to invite technical difficulties. These and other problems have limited the use of the digital VTRs in the home.

SUMMARY OF THE INVENTION

It is an object of the present invention to provide an improved magnetic video recording and/or reproducing method and apparatus.

It is another object to provide a magnetic video recording and reproducing method and apparatus which can easily achieve segment recording and reproducing by making sufficient allowance for skew correction.

It is another object to provide a magnetic video recording and reproducing method and apparatus using segment recording and reproducing to eliminate skew.

It is another object to provide a magnetic video recording reproducing method to enable a rotary head helical scan type VTR for segment recording and reproducing video signals having a very short horizontal synchronizing period.

It is another object to realize the segment recording with an analog system in the home VTRs.

In order to attain the above object, according to the present invention, one vertical scanning period of the video signal is divided into an n(n is an integer the equal to or larger than two) number of blocks, a time axis of series of the video signal blocks is transformed such that a redundant period is formed as an excess duration between the divided video signal blocks and each of the transformed video signals is consecutively recorded through recording heads on each of oblique tracks in such a manner that a recording start point on each of the oblique tracks appears in the redundant period. In a reproducing mode, each of the transformed video signals is consecutively reproduced by the heads, a skew correction is performed for the redundant periods and thereafter a time-axis correction is executed to eliminate the redundant periods.

If there are audio signals contained in the vertical blanking periods of the original video signals, first the audio signals should be eliminated from the vertical blanking periods. With reference to a predetermined position of the vertical blanking period of the video signals, the video signal block for a first 1/n vertical period is recorded on a first oblique track, and after the video signal block for a second 1/n vertical period has been delayed by the redundant period, that is, a predetermined period $\tau$ sufficient to correct the skew in the reproducing mode, the video signal block for the second 1/n vertical period is recorded on a second oblique track. Generally, the video signal block of an mth (where m designates an integer equal to or smaller than n) 1/n vertical period is recorded in an mth oblique track, after it has been delayed by a predetermined period $(m-1)\tau$. By these operations, in the step of transforming, the video signal blocks in one vertical period are delayed to a maximum $(n-1)\tau$ from the original video signals. The vertical blanking period is shortened by forming the redundant periods. In general, it is preferable to select a shortened period with the same length as an increased period by eliminating the audio signal from the vertical blanking period.

On the redundant periods around switching points between the oblique tracks, a certain constant potential signal may be recorded, to enable a detection of a zero level of the chrominance signals in the reproducing mode.

Further, it is preferable that switching points rise and fall of switching signal steps,) of head switching signals generated in synchronization with rotation of the rotary heads generally occur at the center of recorded positions of the redundant periods on the oblique tracks.

The audio signals which have been eliminated from the vertical blanking period are recorded by the other means. In the rotary head helical scan type VTR, for example, an audio overlap recording may be conducted with the video signals blocks recorded on the tape for 180 degrees around a rotary cylinder by the above method, and the audio signals may be recorded on the rest of the tape, which is wound more than 180 degrees around a rotary cylinder.

BRIEF DESCRIPTION OF THE DRAWINGS

FIG. 2a to 2d illustrate waveforms occurring at selected parts of the circuit shown in FIG. 1;

FIGS. 12a to 12k illustrate waveforms at respective portions of the circuit shown in FIG. 11;

FIGS. 15a through 15d illustrate waveforms showing another video signal format recorded by the present invention.

DETAILED DESCRIPTION OF THE PREFERRED EMBODIMENT

The present invention will be described in connection with a recording system circuit block diagram of FIG. 1 and the signal waveforms shown in FIGS. 2a and 2b. These figures show the embodiment corresponding to the two-head, four segment VTR.

Figure 1:
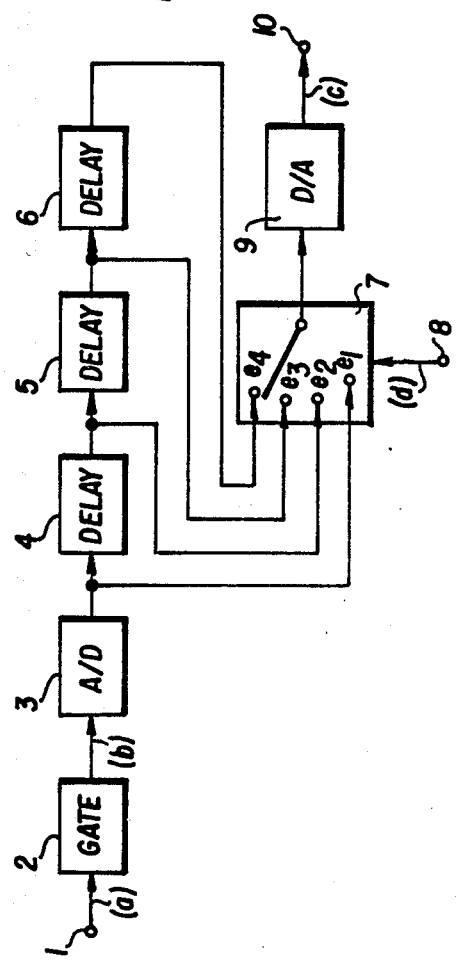
FIG. 1 shows a circuit block diagram of one embodiment of a recording system according to the present invention.

Video signals of the type shown in FIG. 2a are applied to a terminal 1 shown in FIG. 1. In FIG. 2a, V indicates the video portion of the signals, which contain the Y and C signals and the vertical synchronizing signals, and V-BLK indicates a vertical blanking period in which audio signals, indicated as A, are time multiplexed. The signals applied to the input terminal 1 are cleared of the audio portion by a gate circuit 2 which is driven on the basis of the vertical blanking phase, to become the signals shown in FIG. 2b. These signals are then converted into digital signals by an A/D converter 3. These digital signals are applied to a switching circuit 7 along with signals passing through a delay circuit 4 constructed of a shift register or the like having a constant delay time, e.g., 1H, where H designates a horizontal period; signals through a similar delay circuit 5, and signals through a delay circuit 6. Switching circuit 7 is driven by a control signal from an input terminal 8. As this control signal for the two-head helical scanning VTR, a head switching signal indicating which head is positioned to face the magnetic tape may be used. The switching signal is shown in FIG. 2d and synchronized with the rotating phase of the rotary cylinder. Moreover, the switching point of the heads is positioned within the V-BLK. The contact wiper of the switching circuit 7 is then switched consecutively to $e_1$, $e_2$, $e_3$, then $e_4$ after the heads have been changed. If the outputs are restored to analog signals by a D/A converter 9; signals shown in FIG. 2c are obtained at an output terminal 10. These signals are recorded on the magnetic tape as FM signals.

As indicated as in FIG. 2c, the signal-free period, corresponding to each delay time of the delay circuits 4, 5 and 6, can be established around the switching point of the heads or the recording signal to provide sufficient redundant periods for skew correction during reproduction. Each of this signal-free period appears synchronized with the phase of the head switching signal even in the reproducing mode so that a timing for the correction can be easily detected. Consequently, the series of blocks of video signals immediately before the vertical blanking period are delayed from the original input signals shown in FIG. 2a by $3H(H=\alpha)$ in the example. If the vertical blanking period having its length increased by elimination of the audio signals is shortened by 3H, it is possible to be restored a time relationship of the video signal coincident with that of the original input signals during each vertical blanking period.

The description above is an example of the four-segment VTR. However, it is evident that a similar method can be used, for a different number of segments.

It is unnecessary to limit the redundant periods, that is, the delay times of the delay circuits 4, 5 and 6 to 1H. The redundant periods may take any value if the time required to correct skew can be provided, and if the output video signals can be restored to a time relationship coincident with that of the originally input signals during each vertical blanking period by eliminating the audio signals. The delay circuits 4, 5 and 6 may have different delay times.

It is not essential to effect the delay after digitization through the A/D converter 3, but the input video signals may be subjected to the delaying process while still in analog form. The digital signals of the output of the switching circuit 7 may be directly modulated rather than through the D/A converter 9 and recorded in the magnetic tape.

It is effective to stabilize the zero level of the chrominance signals, if the signal-free period, i.e., the redundant period, of 1H, is set at a constant potential, and clamped at a constant direct-current potential in the signal processing circuit. Even if the horizontal blanking period is too short for clamping it is effective to precisely stabilize the zero level of the chrominance signals, as has been described hereinbefore. This clamping timing can also be easily detected from the head switching signals even in the reproducing mode.

Figure 3:
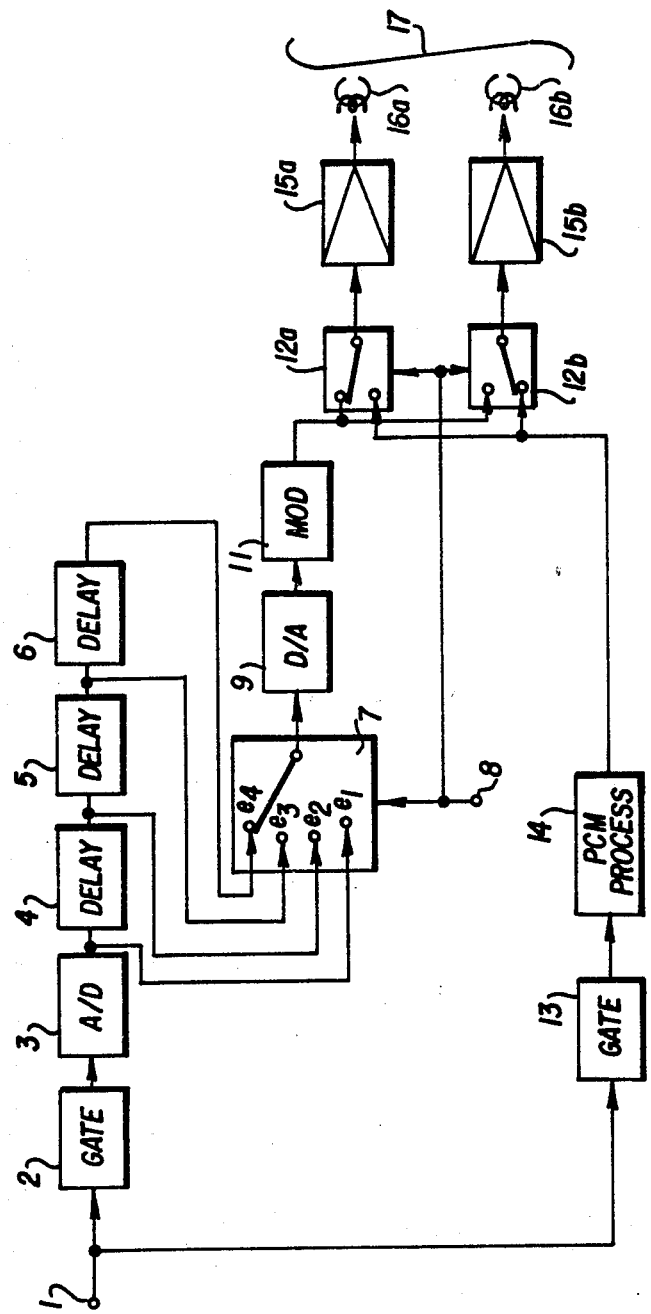
FIG. 3 shows a circuit block diagram of another embodiment of the recording system of the present invention.

We have not yet discussed the audio signal recording method. This will be described with reference to FIG. 3 which shows the embodiment of the present invention in the discussion of two-head helical scanning. In FIG. 3, circuit construction from the input terminal 1 to the D/A converter 9 may be identical to that of FIG. 1. The output of the D/A converter 9 is modulated into an FM modulated signal by an FM modulator 11 and is applied to one terminal of each switching circuit 12a and 12b. The signal from the input terminal 1 is applied to a gate circuit 13, from which the audio signal portion subjected to PCM is extracted on the basis of the phase of the vertical blanking. Of course, the gate circuits 2 and 13 may be constructed from one switching circuit, respectively. The audio signal portion is modulated suitable for recording on the magnetic tape by a PCM processor 14, and is applied to the remaining terminal of each of the switching circuits 12a and 12b. These circuits 12a and 12b are also driven in response to the head switching control signal from the input terminal 8. The outputs of the switching circuits 12a and 12b are applied through two recording amplifiers 15a and 15b to two video heads 16a and 16b, respectively. The magnetic tape 17 is wound slightly more than 180 degrees on the rotary cylinder mounting the video heads 16a and 16b. If, in this case, the two video heads 16a and 16b are equipped with the switching circuits 12a and 12b and the recording amplifiers 15a and 15b of different systems, as in the present embodiment, it is possible to achieve audio overlap recording in which the section of 180 degrees records the video signals whereas the audio signal is recorded in the remaining extension section.

With a segment recording VTR, the interval at which the audio signals are to be recorded in the extension of the video tracks may be arbitrarily selected. It is only necessary to transform the time axis with PCM processor 14. This processor 14 may have a transforming function to provide some redundancy for the audio signals.

The description thus far has been limited to audio overlap recording. The present invention is not, however, limited thereto; the output of the preceding gate circuit 13 may be returned to an analog base band signal so that it can be subjected to a bias recording operation by a fixed head at the end region of the magnetic tape.

Figure 4:
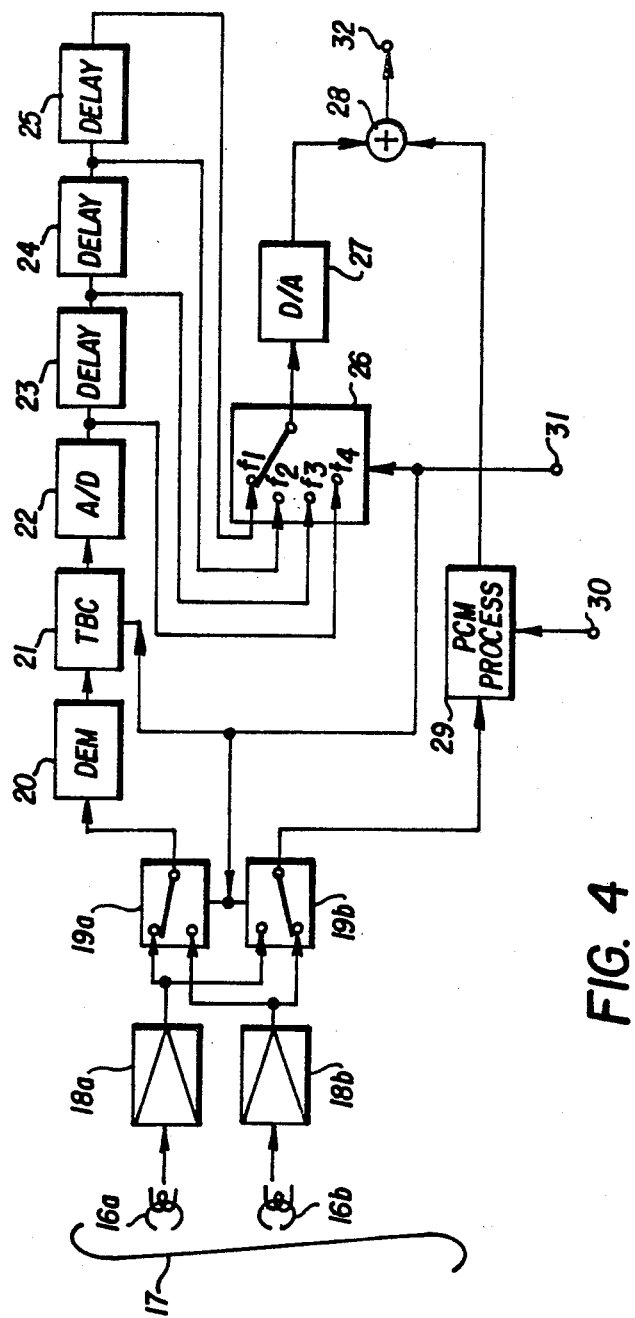
FIG. 4 shows a circuit block diagram of one embodiment of a reproducing system according to the present invention.

Next, an embodiment in which the signals recorded in the manner thus far described are to be reproduced, will be described with reference to the circuit block diagram of FIG. 4 and the signal waveforms shown in FIGS. 5a to 5c. These figures show how signals recorded on the basis of the embodiment of FIG. 3 are to be reproduced. The video heads 16a and 16b and the magnetic tape 17 may be identical to those of FIG. 3. The reproduction will be described in the following.

The output of the video heads 16a and 16b to be reproduced is applied to switching circuits 19a and 19b after being amplified to suitable levels by reproducing amplifiers 18a and 18b. These switching circuits 19a and 19b are driven by the head switching signals provided from an input terminal 31 which come from and are synchronized with the rotating phases of the rotary heads for reproduction, so that the video signals and the audio signals appear at the outputs of the switching circuits 19a and 19b separately as a result of the overlap recording.

The output of the switching circuit 19a is demodulated by an FM demodulator 20 and is applied to a time-axis correcting circuit 21. Into this correcting circuit 21, there is also introduced the head switching signal provided from the input terminal 31 which is synchronized with the redundant period introduced during the video track recording. Skew occurs during that signal-free period through effects of signal processing during recording. This allows the correcting circuit 21 sufficient time to correct skew in response to the switching signal. The correcting circuit 21 can therefore output video signals which do not have time-axis fluctuation such as the skew, the same as the signals shown in FIG. 2c. The video signals provided from the correcting circuit 21 are shown in FIG. 5a.

Next, these analog signals are converted into digital signals by an A/D converter 22. They are alternately applied to a switching circuit 26 together with signals through a delay circuit 23 which has approximately the same delay time as that of the delay circuit 6 of FIG. 3, signals through a delay circuit 24 which also has approximately the same delay time as that of the delay circuit 5, and signals through a delay circuit 25 which has approximately the same delay times as that of the delay circuit 4. Switching circuit 26 is driven by the head switching signal applied via the input terminal 31 so that it is switched to f₁ during and immediately after the vertical blanking period, and to f₂, f₃ and f₄, after the subsequent head switching points. If the output of the switching circuit 26 is restored to the analog state by D/A converter 27, video signals similar to those shown in FIG. 2b can be generated. This is shown in FIG. 5b. The output of the D/A converter 27 is applied to an adder 28.

The audio output of the preceding switching circuit 19b is demodulated by a PCM processor 29 in response to a control signal applied to an input terminal 30, so that the output is similar to the recording input signal. This demodulated signal is applied to the adder 28, then, it has been adjusted into phase with the signal indicating the vertical blanking period after the time-axis correction.

Figure 5:
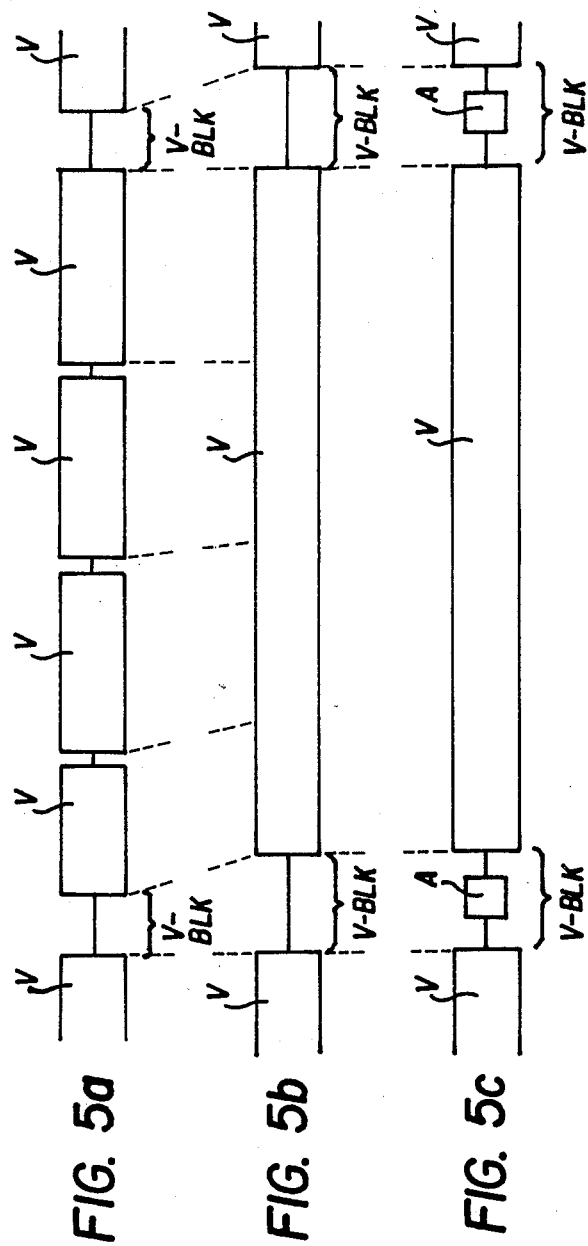
FIG. 5a to 5c illustrate waveforms occurring at selected parts of the circuit shown in FIG. 4.

The video signals and the audio signals are added in the adder 28 and the resulting signal shown in FIG. 5c are applied to terminal 32. The resulting signal is free of skew due to time axis error and is, therefore substantially identical to the input signals shown in FIG. 2a; therefore, recording and reproducing operations can be achieved as planned.

Since the redundant periods have been established during recording at the head switching points the signal-free period can be detected by using the phase of the switching signals during reproduction so that skew can be timely corrected. Even with skew occurring before the time-axis correction, there is sufficient time for clamping in the signal-free period in response to the phase of te head switching signal, so that the zero level of the chrominance signal can be stabilized.

Figure 6:
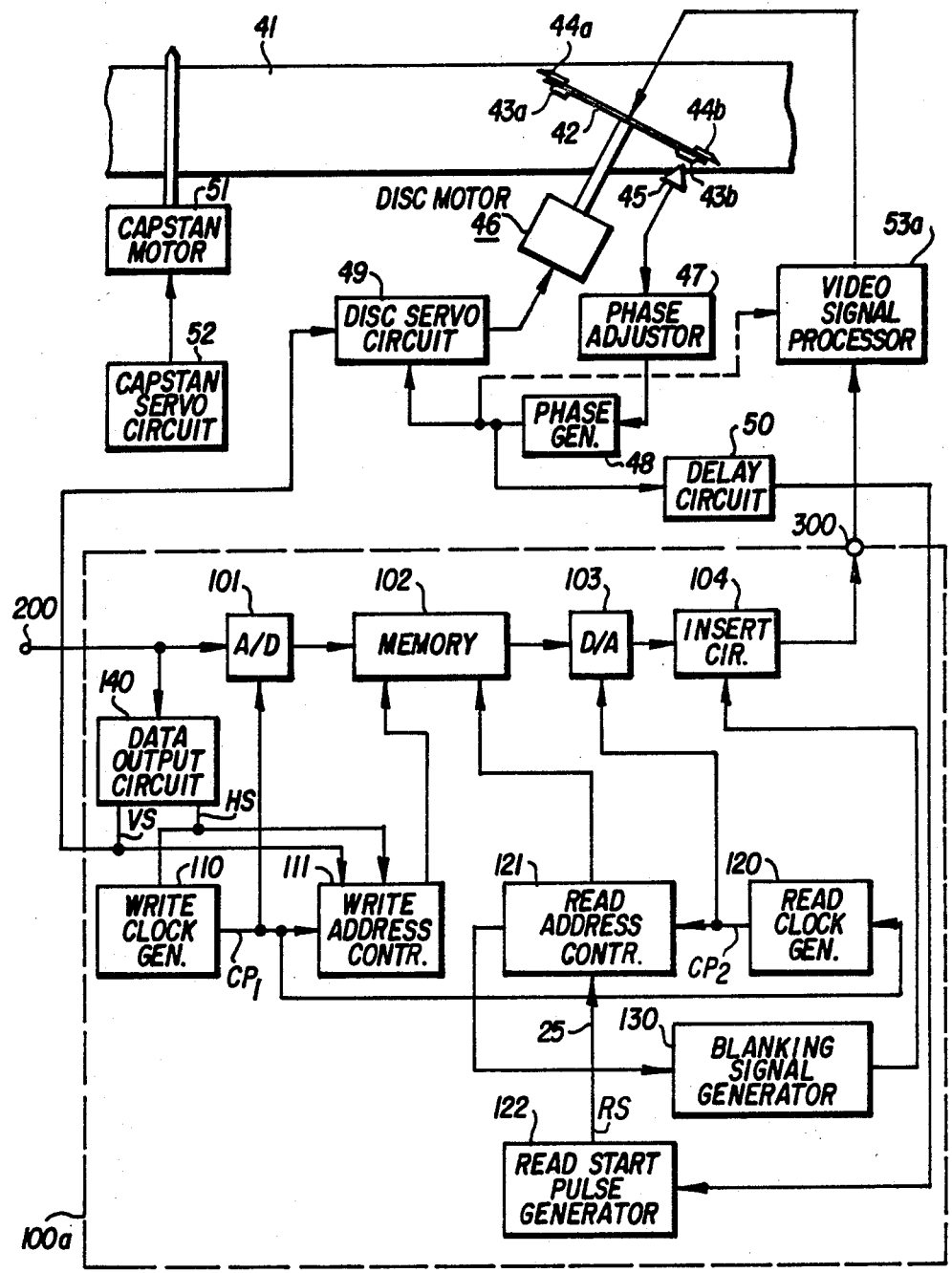
FIG. 6 shows a circuit block diagram of another embodiment of the recording system of the present invention.

FIG. 6 is a block diagram showing the third embodiment of a video signal recording system where the present invention is also applied to a two-head helical scanning VTR. FIGS. 7a to 7k are waveform charts explaining the operations of the same. FIG. 8 diagrams the pattern of tracks obtained from the same.

In FIG. 6, a magnetic tape 41 is fed by a capstan motor 51, which has its speed held constant by a capstan servo-circuit 52. Magnetic heads 44a and 44b have different azimuths and are carried on a disk 42 at an angle of 180 degrees with respect to each other so that they are rotated with the disk 42 by the action of a disk motor 46. The tape 41 is wound on the disk 42 at 180 degrees or more to form a part, in which the heads 44a and 44b simultaneously face the tape 41 in an "overlap region" of the tracks, as indicated at Q₁ and Q₂ in FIG. 8. On the disk 42, there are carried two magnets 43a and 43b separated by an angle of 180 degrees which are detected by a tach head 45 to generate tach pulses (as shown in FIG. 7c) which are synchronized with the rotations of the heads 44a and 44b. These tach pulses from the tach head 45 have their phases so adjusted by a phase adjuster 47 that the heads 44a and 44b and the tape 41 may have predetermined positional relationships or, more specifically may be delayed by a time $\tau_U$, as shown in FIG. 7c, so that the output of the phase adjuster 47 is fed to a pulse generator 48. Generator 48 provides pulses (which are shown in FIG. 7d and which will be called a "head switching signal"), synchronized with the rotations of heads 44a and 44b and which have a duty cycle of 50%. Indicated at numeral 140 is a synchronism data output circuit, which responds to an input signal (as shown in FIG. 7a) from a terminal 200 to provide a signal (e.g., a hatched signal contained in a vertical blanking period $\tau_B$ shown in FIG. 7a) VS, which is based on the vertical synchronism data contained in that input video signal, and a signal HS, which is based on horizontal synchronism data, such as a horizontal synchronizing signal or a burst signal. The vertical synchronism data VS (as shown in FIG. 7b) from said circuit 140 is fed as a servo reference signal for recording through a disk servo-circuit 49. Disk servo-circuit 49 compares the phases of vertical synchronism data VS from circuit 140 and the head switching signal from the circuit 48 to provide an error signal according to the phase difference between VS and the head switching signal and to feed the error signal to a drive circuit of disk motor 46. As a result, disk motor 46 is so rotationally controlled that the vertical synchronism data VS and the head switching signal may be synchronized in phase or, more specifically, so that the phase difference time between the vertical synchronism data VS (as shown in FIG. 7b) and the head switching signal (as shown in FIG. 7d) is $\tau_1$.

Here, generally speaking, if n-segment recording is to be conducted, then the video signals have their field divided into n segments so that they are recorded on n oblique or slant tracks. The rate of rotation M of the disk motor 46 in the two-head helical scan type VTR shown in FIG. 6 is determined by the disk servo-circuit 49 so as to satisfy the following equation, where the field frequency of the video signals is designated by $f_U$:

$$M = f_0^b / 2] n \text{ (r.p.m.)} \dots \quad (1)$$

The operations of the embodiment of FIG. 6 will be described in the following description if the present invention is applied to the NTSC, PAL and SECAM television systems for example, and for four-segment recording in which M=120 r.p.m. is derived from the equation (1) because of $f_0 = 60$ Hz and n=4.

The number, X, of horizontal scanning lines (hereafter called "lines") of the video signal to be recorded in this case for a period of 180 degrees (as indicated at T in FIGS. 7c and 8 in the longitudinal direction of the tracks is given by the following equation if the number of lines per field of the video signals is designated by N:

$$X = N/n \dots \quad (2)$$

X is derived from the following equation for conventional television systems (e.g., of the NTSC type) in which the number of horizontal scanning lines is 262.5 for one field (or 525 for on frame):

$$X = 65.625 \dots \quad (3)$$

In the present invention, as will be described hereinafter, video signals having the number of lines equal or smaller than [X] lines, which denotes the largest integer not exceeding the number X and which has a value of 65 in equation (3), are recorded during each period T of 180 degrees in each longitudinal track direction.

The embodiment shown in FIG. 6 corresponds to the case in which the number $N_1$ of lines to be recorded for period T is set, as follows:

$$[X] \geq N_1 = 64 \dots \quad (4)$$

Figure 7:
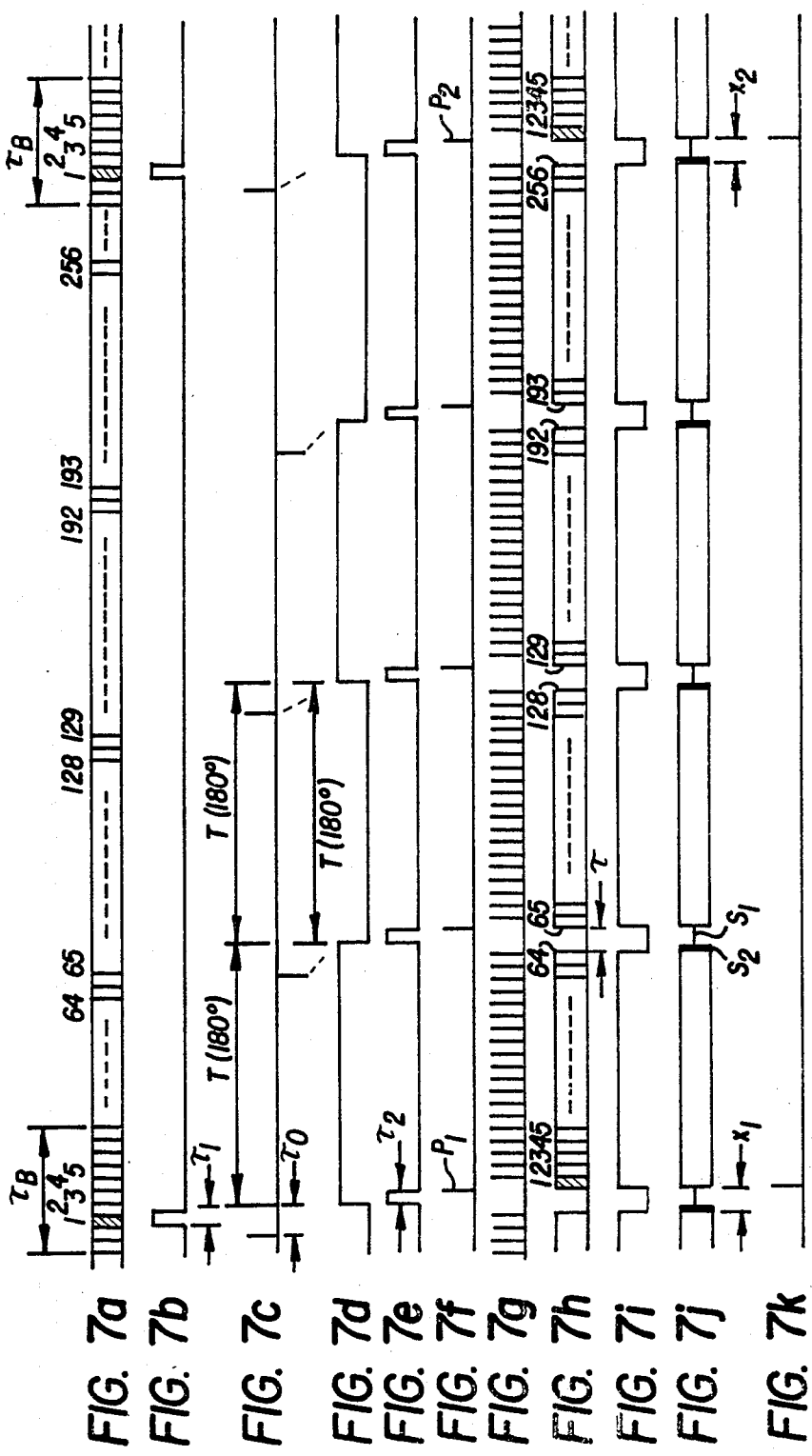
FIG. 7a to 7k illustrate waveforms occurring at respective portions of the circuit shown in FIG. 6.
Figure 8:
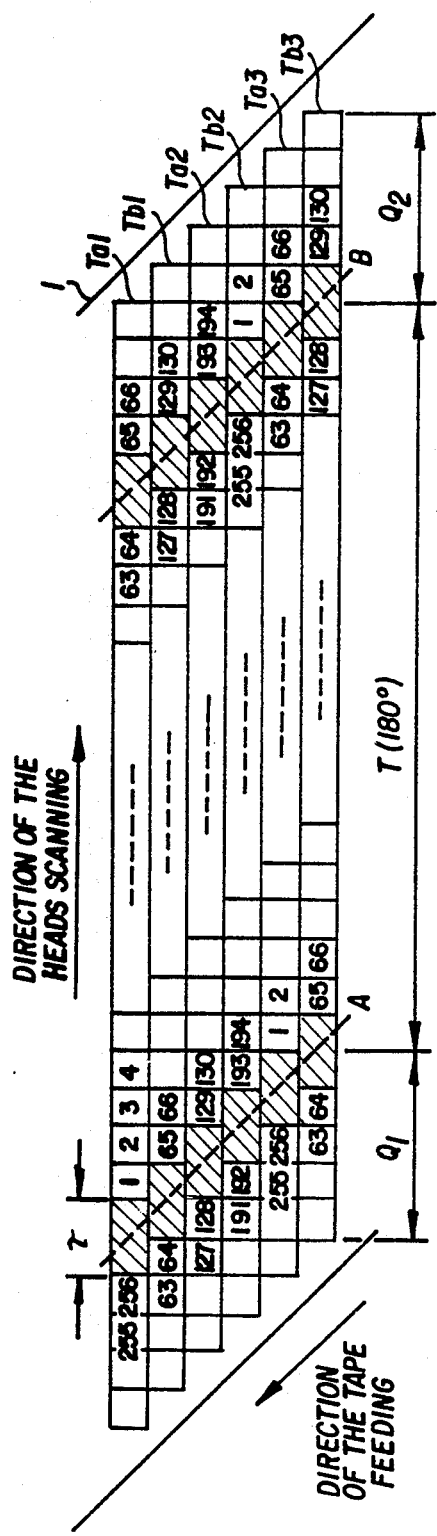
FIG. 8 illustrates a schematic diagram of a tape pattern on which video signals are recorded by the circuit shown in FIG. 6.

The numerals 1 to 256 appearing in FIGS. 7 and 8 indicate the line numbers of the video signals to be recorded on the tape.

Next, block 100a defined by single-dotted lines in FIG. 6 indicates a time-axis transforming unit during the recording mode in accordance with the present invention. In the same figure, numeral 300 indicates an output terminal of the video signals to be recorded, which have been time-axis transformed by unit 100a. A write clock pulse generator 110 generates and outputs write clock pulses $CP_1$ which are synchronized with the horizontal synchronism data HS from data output circuit 140. Write clock pulses $CP_1$ are fed to both a write address controller 111 and an A/D converter 101. The write address controller 111 includes a counter and is triggered by the horizontal synchronism data HS from the circuit 140 to count the write clock pulses $CP_1$ from the generator 110 so that it provides an address corresponding to the counted value and feeds the address signal as a write address signal to a memory 102. The address signal is initiated sequentially for each horizontal scanning period by the horizontal synchronism data HS. As a result, the input video signals, as shown in FIG. 7a, are converted sequentially into digital signals by the A/D converter 101 synchronized with write clock pulses $CP_1$ provided from the generator 110 so that the output digital signals are written sequentially, as a unit of the horizontal scanning period, in the memory 102 in accordance with the address provided by controller 111.

The storage capacity of the memory 102 is selected to have minimum capacity necessary in accordance with the redundant period, and an approximate value of the minimum capacity may be a small value if the value is sufficient for storing the data of several lines of the input video signals.

Here, for example, if the storage capacity of the memory 102 is set at 8H, the storage capacity of one line of the input video signals is assumed to be 1H, and the memory 102 is constructed of eight line units $M_1, M_2, \ldots M_8$, the video signals of the line numbers 1, 9, 17, ..., and 249; 2, 10, 18, ..., and 250, ..., and 8, 16, 24, ..., and 256 are stored in the first, second, ..., and eighth memory locations $M_1, M_2, \ldots,$ and $M_8$, respectively, cyclically and sequentially in the order of their time series.

To ensure that these writing operations occur in the order of the time series, vertical synchronism data VS from the circuit 140 is fed to control the write address controller 111 so that the video signal of line number 1 of each field is always written in the memory location $M_1$.

Next, a read clock pulse generator 120 generates read clock pulses $CP_2$ which are synchronized with the write clock pulses $CP_1$ from the circuit 110. One embodiment of the read clock generator 120 is shown in FIG. 9.

Figure 9:
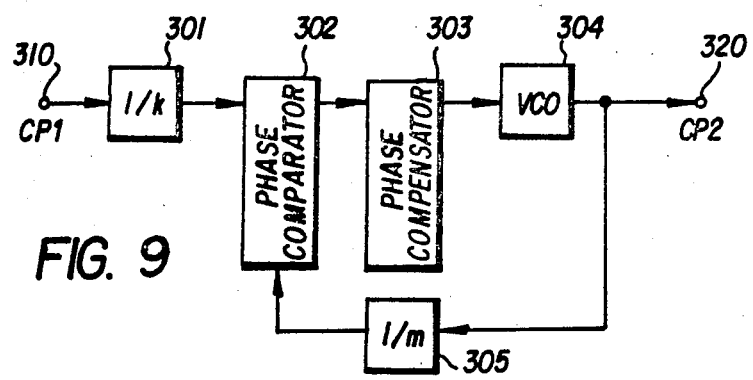
FIG. 9 shows a circuit block diagram of an embodiment of a read clock pulse generator 120 shown in FIG. 6.

In FIG. 9, reference numeral 310 denotes an input terminal for the write clocks pulses $CP_1$ from the circuit 110, and numeral 320 indicates an output terminal for the read clock pulses $CP_2$. The write clock pulses $CP_1$ from the terminal 310 have their frequency divided by a frequency divider 301 into a suitable value of $1/k$ (wherein k designates an integer equal to or larger than 1), and the output of the frequency divider 301 is fed to one input of a phase comparator 302. The other input of phase comparator 302 is fed with a feed back signal which is prepared by dividing the frequency of the output from voltage control oscillator 304 into a suitable value of $1/m$ (wherein m designates an integer equal to or larger than 1) by frequency divider 305. Phase comparator 302 compares the phases of the outputs from the circuits 301 and 305 to provide a phase difference signal varying in accordance with the phase difference. The output from circuit 302 is fed as a control voltage for voltage control oscillator 304 through a phase compensator 303. The output from said circuit 304 is applied as read clock pulses $CP_2$ to terminal 320. Circuits 302-305 described above together construct a phase lock loop circuit, by which the read clock pulses $CP_2$ from the circuit 304 are phase-synchronized with and coupled to the write clock pulse, $CP_1$ from the terminal 310. The frequency $f_2$ of the read clock pulses $CP_2$ from the read clock pulse generator 120 having the construction described above is given by the following equation where the frequency of the write clock pulses $CP_1$ from the aforementioned circuit 110 is designated by $f_1$:

$$f_2 = m/k \cdot f_1 \ldots \quad (5)$$

Referring now to FIG. 6, the read clock pulses $CP_2$ from the read clock pulse generator 120 are fed to a read address controller 121 and the D/A converter 103. A delay circuit 50 is triggered by the rising and falling edges of the output (as shown in FIG. 7d) from the pulse generator 48 to provide pulses (shown in FIG. 7e) having a predetermined time width $\tau_2$. The output from delay circuit 50 is fed to a read start pulse generator 122, which generates pulses (shown in FIG. 7f) in response to the output from the circuit 50. Output pulses $P_1$ are synchronized with tach pulses (as shown in FIG. 7c) from the tach heads 45 and are therefore synchronized with the rotations of heads 44a and 44b. Output pulses $P_1$ are fed to read address controller 121 as read start pulses RS for commanding the read start for the memory 102 during each scanning period of the heads 44a and 44b.

Read address controller 121 is constructed of a counter and is triggered in response to the read start pulses RS to count read clock pulses $CP_2$ from read clock pulse generator 120 so that an address signal corresponding to the counted value is fed as a read address signal to memory 102.

Figure 10:
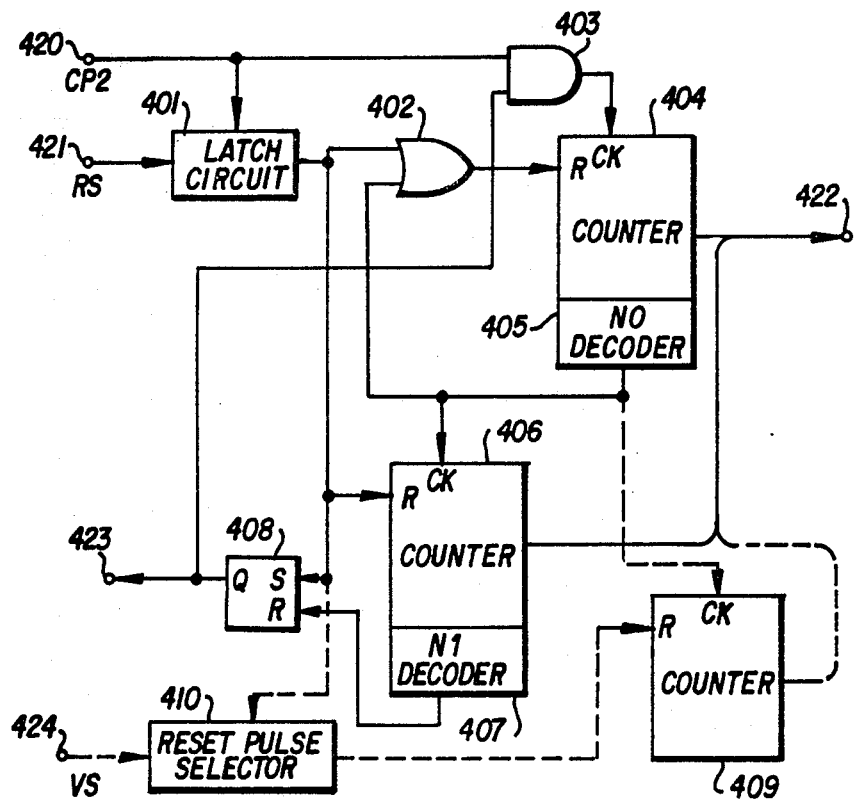
FIG. 10 shows a circuit block diagram of an embodiment a read address controller 121 shown in FIG. 6.

One embodiment of read address controller 121 is shown in FIG. 10 where reference numeral 420 indicates an input terminal for read clock pulses $CP_2$ from 120; numeral 421 an input terminal for the read start pulses RS from the generator 122; and numeral 422 an output terminal for the read address signal. The read start pulses RS from the terminal 421 are synchronized with the read clock pulses $CP_2$ from the terminal 420 by latch circuit 401. The output of 401 is applied through an OR gate 402 to a reset input R of counter 404 so that the counter 404 is reset. This counter 404 has its clock input CK fed with the read clock pulses $CP_2$ from the terminal 420 through AND gate 403. Indicated at numeral 408 is an R/S flip-flop which is reset by the output from the latch circuit 401 so that its output Q (as shown in FIG. 7i) takes a high level. As a result, the AND gate 403 is opened so that the counter 404 is fed with clock pulses $CP_2$ from the terminal 420 to start its counting operation. Numeral 405 denotes a decoder for the value of the counter 404 which generates pulses when the value of the counter 404 is $N_0$, which is set so as to equal the number of write clock pulses $CP_1$ generated during one horizontal scanning period of the video signal as shown in FIG. 7a. The output pulses (as shown in FIG. 7g) from decoder 405 are fed through the OR gate 402 to the reset input R of the counter 404 so that the counter 404 is reset again to restart its counting operation. The operations thus far described are repeated on the basis of output pulses from decoder 405. The output of counter 404 is fed as the read address signal of memory 102 through terminal 422. Since the value N₀ is set so as to equal the number of the write clock pulses for one horizontal scanning period of the video signals, all the video signals written in the memory 102 are consecutively read for the horizontal scanning period without falling off.

The output from the decoder 405 is also input as a clock input CK of a counter 406. Moreover, this counter 406 has its reset input R fed with the output from circuit 401 so that it is reset by read start pulses $P_1$ to start its counting operation of the output pulses from the decoder 405. A decoder 407 decodes the value of the counter 406 to generate pulses when the counter 406 reaches the value $N_1$ (which is set at sixty-four in the embodiment under consideration). The output from the counter 406 is fed as the read address signal. Flip-flop circuit 408 is reset by the output from the decoder 407 to take its output Q (as shown in FIG. 7i) to a low level. As a result, AND gate 403 is closed so that the counting operations of the counters 404 and 406 are interrupted.

The operations thus far described are repeated for the period T of the read start pulses RS from the terminal 421. As a result, the video signals, which are read sequentially from the memory 102 in response to the read address signal output from the terminal 422 and which are converted into analog signals by the D/A converter 103, take the shape shown in FIG. 7h. For the first vertical scanning period, specifically, video signals having a series of continuous line numbers 1, 2, 3, . . . , and 64 are output during the first scanning period T of head 44a, and the video signals having a series of continuous line numbers 65, 66, . . . , and 128 are output during the subsequent scanning period T of head 44b. Likewise, the video signals are provided sequentially in the order of the line numbers 129, 130, . . . , and 192 for the subsequent scanning period T of the head 44a and in the order of the line numbers 193, 194, . . . , and 256 for the subsequent scanning period T of the head 44b. Moreover, the form of the output video signals are absolutely identical even in the next vertical scanning period, so that the video signals are repeatedly provided in similar series of field periods.

Since value $N_1$ is determined to satisfy the foregoing equation (4), the redundant period $\tau$, (during which the video signals are neither output, nor required for reproduction even if output), can be generated at the switch between scanning operation of each head, as may be inferred from FIG. 7h. Redundant period $\tau$ is given in the following equation with a horizontal scanning period $T_H$ of the original video signals and the foregoing equations (3), (4), and (5):

$$= (X - N_1) \cdot T_H \cdot m/k$$

$$= 1.625 \cdot T_H \cdot m/k \qquad (6)$$

Here, the value of m/k corresponds to the ratio of the frequency-divided values (k and m) of the frequency dividers 301 and 305 shown in FIG. 9. As is apparent from the above equation, the redundant period $\tau$ can generally be enlarged. In the embodiment described above, the redundant period can be made larger than the value $T_H$ if $1.625 \cdot m/k \geq 1$.

In the present invention, the values of m and k can be arbitrarily determined. Especially in the case of m=k, the frequency ($f_1$) of the write clock pulses CP may equal the frequency ($f_2$) of the read clock pulses $CP_2$. In this case, read clock pulse generator 120 may be eliminated, and the write clock pulses $CP_1$ from circuit 110 may be fed directly to the aforementioned circuits 121 and 103.

Circuit 408 of the read address controller 121 in FIG. 10 produces an output which coincides with the redundant period $\tau$, shown in FIG. 7i, which takes a low level for each redundant period and a high level for the remainder of the vertical scanning period. The output of flip-flop 408 is fed through a terminal 423 to a blanking signal generator 130 shown in FIG. 6. Generator 130 may provide either a signal as designated by $S_1$ in FIG. 7j, which corresponds to a constant level, such a black or grey, of the video signal output from the D/A converter 103; or a signal as designated by $S_2$ in FIG. 7j which is prepared by adding an arbitrary signal such as synchronism data indicating the presence of that redundant period $\tau$ to the constant level of the former signal $S_1$. A circuit 104 inserts a blanking signal from the circuit 130 for the redundant period $\tau$ of the video signal from D/A converter 103. Thus, the video signal (as shown in FIG. 7j) output from the circuit 104 are fed through output terminal 300 to a video signal processor 53a, then recorded and processed by circuit 53a, and fed to the heads 44a and 44b to be sequentially recorded on tape 41.

The read address controller 121 shown in FIG. 10 corresponds to the case in which the output of counter 406 is also the read address signal for the horizontal scanning unit like the output of counter 404. The present invention is not, however, limited thereto. As indicated by broken lines FIG. 10, there may be additionally provided a counter 409 for the output pulses from decoder 405 so that is also may output its count as a read address signal to terminal 422 in place of the output from counter 406. In this case, to ensure the read starting operation of the field period of memory 102—more specifically, to start the reading operation from the video signal of line number 1 written in the first memory $M_1$ of the memory 102, the vertical synchronism data from circuit 140 is fed through terminal 424 to a reset pulse selector 410, by which pulses designated as by $P_1$, $P_2$ and so on in FIG. 7f contained during the vertical blanking period $\tau_B$ of the original input video signal is selected and separated to rest counter 409 by the output pulses, as shown in FIG. 7k, from said circuit 410. Thus, with the latter method, there can be attained an effect that the number of the line memory 102 can be arbitrarily set to ensure a series of writing and reading operations with neither an excess nor a shortage of lines.

The pattern of the tracks on the tape 41, which are obtained by the recording method of the present invention described, is shown in FIG. 8.

In FIG. 8, $T_{a1}$, $T_{a2}$, $T_{a3}$ denote the tracks which are recorded and formed by the scanning operation of the head 44a, and $T_{b1}$, $T_{b2}$, $T_{b3}$ denote the tracks which are recorded and formed by the scanning operation of the head 44b. Moreover, broken lines A and B denote the positions to which the phases of the rise and fall of the head switching signals shown in FIG. 7d output from the pulse generator 48 correspond to the pattern recorded on tape 41. The hatched period $\tau$ corresponds to the redundant period τ. Numerals 1 to 256 attached to the respective tracks designate the line numbers of the aforementioned record video signals.

In the present invention, by forming the redundant periods by means of time-axis transforming unit 100a of FIG. 6, it is possible to completely eliminate skew caused by segment recording, in the reproduced video signal. As is apparent from this description, the line number of the video signals, which are output from time-axis transforming unit 100a and recorded, is short. Although the video signals of the line numbers 1 to 256 for one field are recorded, more specifically, the line number is shortened by 6.5 lines for the 262.5 lines which were in the original video signals supplied to terminal 200. In the present invention, however, the shortening of the line numbers in the recorded video signals, is compensated by the vertical blanking period $\tau_B$ contained in the original video signals.

In the latter, especially, in the recording operation, the rotational phases of the heads 44a and 44b are so controlled by disk servo-circuit 49 that the positions as designated by $x_1$, $x_2$ shown in FIG. 7j, may be in the vertical blanking period $\tau_B$ of the original video signals (as shown in FIG. 7a). Thus, even with a reduction of line numbers, the reduced lines are still accommodated within the vertical blanking period of the original video signal and do not lead to a loss of the video data for projection on the reproducing frame.

Figure 11:
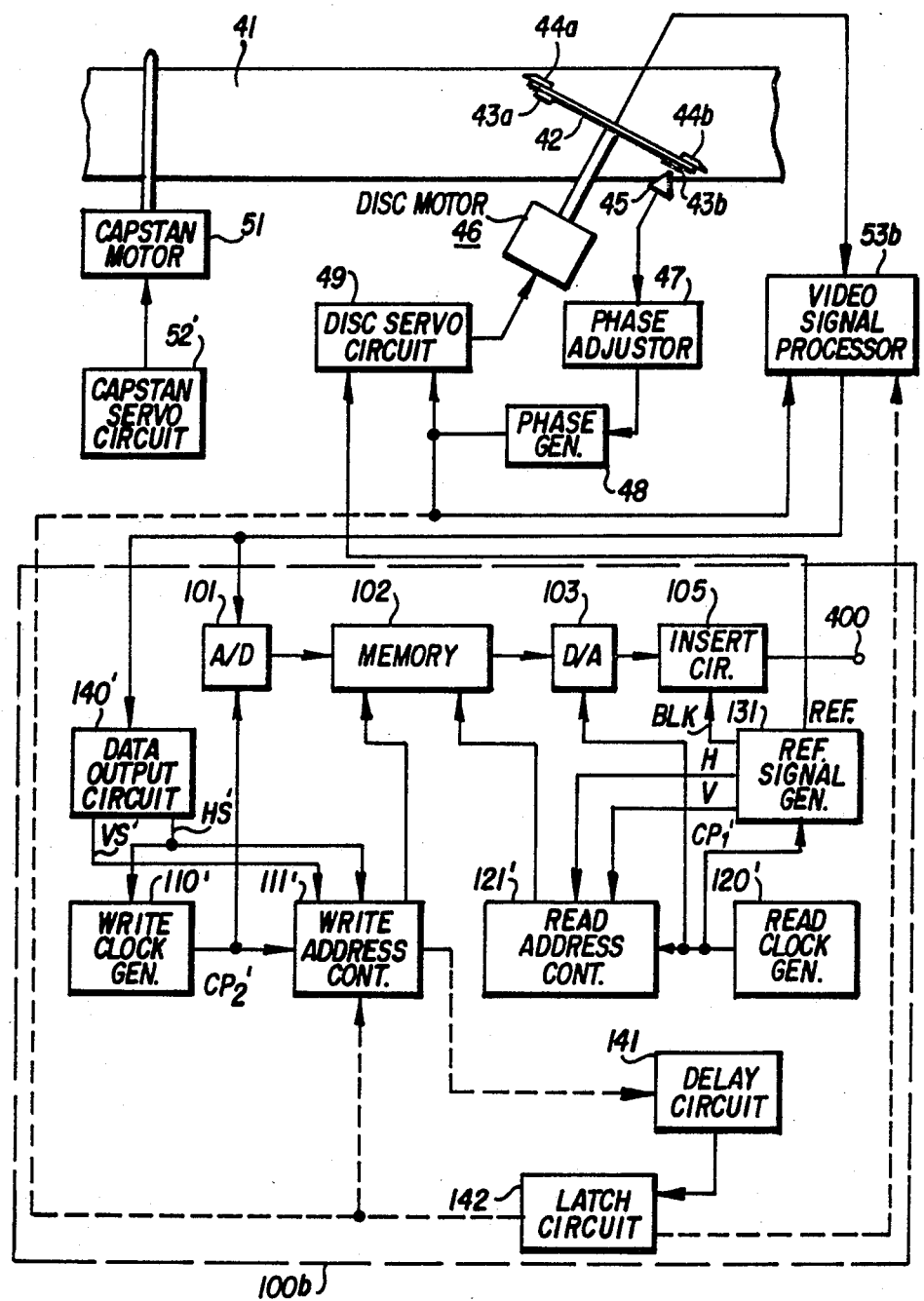
FIG. 11, shows a circuit block diagram of another embodiment of the reproducing system of the present invention.

Next, another embodiment of the reproducing system according to the present invention for recreating video signals recorded as above, is shown in FIG. 11. Waveform charts for explaining the operations of the reproducing apparatus are shown in FIGS. 12a to 12k.

In FIG. 11, the reproducing apparatus can be partially shared with the aforementioned recording apparatus of FIG. 6, and their common parts are indicated at the identical reference numerals. The operations of those common parts are similar to the aforementioned ones, and their descriptions are omitted.

The video signals, which are alternatively reproduced from the tape 41 by the heads 44a and 44b, are suitably reproduced and processed by a reproduced video signal processor 53b which feeds its output (as shown in FIG. 12a) to a time-axis transforming unit 100b. A synchronism data output circuit 140' separates and outputs vertical synchronism data VS'(as shown in FIG. 12c) and horizontal synchronism data HS' (as shown in FIG. 12d) from the reproduced video signals from circuit 53b. A write clock pulse generator 110' generates and outputs write clock pulses $CP_2'$ which are synchronized with the horizontal synchronism data HS' from the circuit 140'.

To generate write clock pulses $CP_2'$, a method of producing clock pulses is used in which clock pulses are continuous for at least one horizontal scanning period in instantaneous phase synchronism with the horizontal synchronism data HS' such as horizontal synchronizing signals or burst signals contained in the reproduced video signals. Moreover, those write clock pulses CP' are generated so as to have the same frequency ($f_2$) as read clock pulses $CP_2$ of FIG. 6. In response to the write clock pulses $CP_2'$ from said circuit 110', the reproduced video signals are converted sequentially into digital signals by the A/D converter 101. A write address controller 111' is constructed of a counter and is started in response to the horizontal synchronism data HS' from data output circuit 140' to count the write clock pulses $CP_2'$ from data output circuit 110' so that address signals corresponding to the counted value are fed as the write address signals of memory 102. These address signals are renewed sequentially as a unit of the horizontal scanning period in response to the horizontal synchronism data HS' so that the outputs from the A/D converter 101 are written sequentially and cyclically in the memory 102 as the horizontal scanning unit.

Here, since recording is made such that the redundant period occurs at the switching point of the scanning operations of heads 44a and 44b, that is, in positions corresponding to the rises and falls of head switching signal shown in FIG. 12b from generator 48, as denoted by the broken lines A and B in FIG. 8, the redundant period τ can be located by means of the head switching signal. By alternately switching the video signals reproduced by the heads 44a and 44b in response to the head switching signal from generator 48 in video signal processor 53b, therefore, all video signals in a scanning period can be reproduced reliably with neither excess not shortage of the lines. More specifically, reproductions are conducted sequentially: in the order of line numbers 1, 2, 3, . . . , 64 for the first scanning period T of the head 44a; in the order of the line numbers 65, 66, . . . , 128 for the subsequent scanning period T of head 44b; in the order of the line numbers 129, 130, . . . , and 192 for the subsequent scanning period T of the head . . . , and 192 for the subsequent scanning period T of the read 44a; and in the order of the line numbers 193, 194, . . . , 256 for the subsequent scanning period T of head 44b. The operations thus far described are repeated for the next field period so that one continuous video signal (as shown in FIG. 12a) is provided by processor 53b.

Write address controller 111' counts a predetermined number—64 in this embodiment—of horizontal synchronism data HS' (as shown in FIG. 12d) from circuit 140' for each scanning period T of the heads 44a and 44b. The output of the write address controller 111' is blocked temporarily after the counting operation is ended for each scanning period before the subsequent horizontal synchronism data HS' are input, i.e., for the period corresponding to the redundant period τ.

As a result, the memory 102 neither receives any signal for the redundant period τ, nor produces any signal, during the redundant period τ. Therefore, all output from generator 101 are written cyclically and sequentially in memory 102 as the horizontal scanning unit with neither an excess nor a shortage of lines of the numbers 1 to 256.

As the method of counting the horizontal synchronism data HS', the controller 111' may start counting the horizontal synchronism data HS' at each rise and fall of the head switching signal from the circuit 48 in response to the head switching signal and thereby count a predetermined number of horizontal synchronism data HS' which are input thereafter. In place of the head switching signal, however, controller 111' may use the vertical synchronism data VS' shown in FIGS. 12c from the circuit 140'. In response to the vertical synchronism data VS', controller 111' may start counting the horizontal synchronism data HS' thereby to subsequently count those horizontal synchronism data HS' consecutively and repeatedly for a predetermined count (e.g., 64).

With the latter counting method, the position of the redundant period τ can be detected automatically on the basis of the vertical synchronism data VS' without using the head switching signal. With that counting method, moreover, the circuit 111' counts a predetermined number of horizontal synchronism data HS' to generate end count pulses shown in FIG. 12e obtained at the end of the counting operation, and these count end pulses are delayed a predetermined period $\tau'$, which is equal to $\tau/2$, as shown in FIG. 12f by the action of a delay circuit 141 so that the head switching signal from the circuit 48 is synchronized at the break of the output as shown in FIG. 12f from the circuit 141 by a latch circuit 142. Then, latch circuit 142 generates signals which have their rising and falling edges in the aforementioned redundant period $\tau$, as shown in FIG. 12g.

The output from latch circuit 142 may be fed to the processor 53b in place of the head switching signal, as shown by broken paths of FIG. 11, to alternately switch the outputs from the heads 44a and 44b. As in previously discussed embodiments, all the outputs can be continuously reproduced with neither excess not shortage.

Next, a read clock pulse generator 120' generates read clock pulses $CP_1'$ having the same frequency ($f_1$) as that of write clock pulses in of FIG. 6. A reference signal generator 131 suitably divides the frequency of the clocks from generator 120' to generate blanking signals (containing synchronism data) BLK having the same shape and frequency as those of the original video signals (shown in FIG. 7a), horizontal synchronism data H, vertical synchronism data V (shown in FIG. 12i), and reference signals REF (as shown in FIG. 12h) having timing such that it precedes the vertical synchronism data V by a predetermined time $\tau_3$. A read address controller 121' is constructed of a counter and is started in response to the horizontal synchronism data H from generator 131 to count the read clock pulses $CP_1'$ from the circuit 120 and provide address signals corresponding to the counted valve as the read address signals for memory 102. These address signals are renewed sequentially for each horizontal scanning period by the horizontal synchronism data H. At the same time, when horizontal synchronism data H are counted to a predetermined number, (256 in the present embodiment), the generator of the read address signals is interrupted. A series of counting operations are restarted in response to the vertical synchronism data V from generator circuit 131, then the operations similar to the aforementioned ones are repeated.

As a result, all the video signals, with line numbers 1 to 256 for one field, are read sequentially from memory 102 in response to the read address signals from the circuit 121', converted into analog signals and output from the D/A converter 103 with neither an excess nor a shortage in a continuous time frame, as shown in FIG. 12j. The blanking signals BLK from the generator 131 are inserted into the output (as shown in FIG. 12j) from that D/A converter 103 by a blanking signal inserting circuit 105.

The reference signals REF from the generator 131 are fed as the servo reference signals for reproduction to the disc servo-circuit 49, by which the servo control identical to the one aforementioned in FIG. 6 controls the rotations of the disc motor 46 with both reference signal REF and head switching signal from the circuit 48 synchronized in phase. Alternatively, reference signal REF (shown in FIG. 12h) and the head switching signal (shown in FIG. 12b) have a phase difference time $\tau_1$.

Capstan motor 51 is rotationally controlled by a capstan servocircuit 52'. Capstan servo-circuit 52' is constructed with a tracking control system which is known in the art for controlling the tape 41 and the relative phases of the heads 44a and 44b to reproduce the signals in a correct manner.

With the servo control described above, the writing operations in the memory 102 are so controlled as to precede the reading operations. As a result, all the video signals written in the memory 102 are correctly read with no deficiency along a stable time axis, with no fluctuation, and the blanking signals eliminated during the recording operation and the synchronism data are compensated in the circuit 105 by the blanking signals BLK on the same stable time axis as that of the read operation.

As a result, a terminal 400 is cleared of skew of the reproduced video signals (as shown in FIG. 12a) as well as time-axis fluctuations so as to output stable video signals thereby restoring the original video signals in high fidelity.

As is apparent from the description thus far made, the correctable amount of the skew, which is obtained according to the present invention, is equal to the redundant period $\tau$ so that adequate allowance can be made for it, as has been expressed by the foregoing equation (6).

Moreover, the redundant period $\tau$ is generated in synchronism with the rotations of the heads so that it is recorded so as to be in a predetermined position on the tape, as shown in FIG. 8, without any fluctuations in that recorded position. As a result, interchangeable reproduction can be facilitated and ensured to remarkably improve the performance and reliability of the apparatus.

Figure 13:
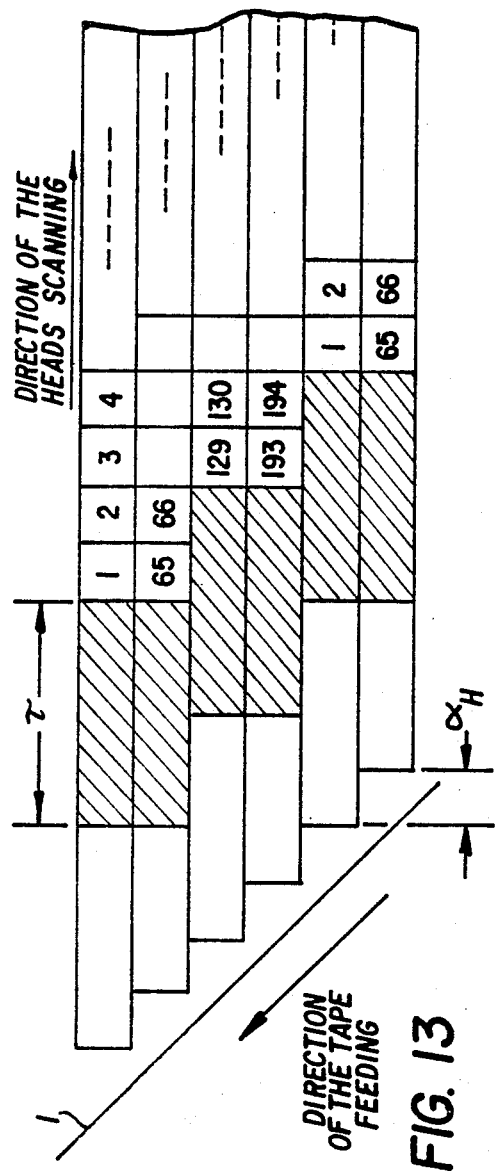
FIG. 13 illustrates a schematic diagram of another tape pattern according to the present invention.

By suitably changing the delay time $\tau_2$, as shown in FIG. 7e, of the delay circuit 50 for each scanning period T of the heads 44a and 44b in the foregoing embodiment of FIG. 6, it is possible as an additional effect to provide an apparatus which can easily change the relative recorded patterns between the adjacent tracks and between the tracks adjoining the former as the horizontal scanning line unit, as shown in the track pattern diagram of FIG. 13. It is possible to produce an arbitrary recorded pattern, without being restricted by misalignment $\alpha_H$ shown in FIG. 13 of the horizontal scanning lines at the edges of the tracks determined in accordance with the relative speeds of the tape 41 and the heads 44a and 44b. Therefore, it becomes possible to reduce interference by crosstalk from the adjacent tracks and their adjoining tracks thereby to provide an excellent image quality.

Figure 14:
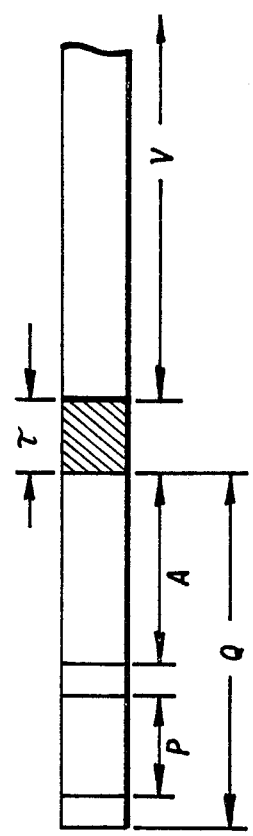
FIG. 14 illustrates a schematic diagram of another recording track pattern according to the present invention.

As is apparent from the description thus far made, with the recording method of the present invention, all the video signals recorded and reproduced are completely processed for the scanning period T for a period of 180 degrees on the tracks of the heads. With the present invention, furthermore, the redundant period $\tau$ can have its recorded position easily positioned on the tape, and this recorded position can be automatically and reliably detected on the basis of the reproduced video signals or on the basis of the predetermined synchronism data ($S_2$, as shown in FIG. 7j) recorded for the redundant period $\tau$. This makes it unnecessary to record the video signals in the overlap regions $Q_1$ and $Q_2$, as shown in FIG. 8, which are indispensable in the analog recording system of the prior art. In other words, as an additional effect, the recording density of the tape can be accordingly enhanced to prolong the recording time. Furthermore, the overlap regions $Q_1$ and $Q_2$ can be used as auxiliary tracks which can record the following signals other than the video signals: PCM audio signals prepared by transformations into the digital signals known in the prior art and by time-axis compression, or tracking control signals such as pilot signals, for example, described in U.S. Pat. No. 4,297,733, to record a variety of signals in high density. One example of the track pattern based on the present invention when another signal is recorded in that overlap region Q is shown in FIG. 14. In this figure, letter A designates the recording region of the PCM audio signals; letter P the recording region of the tracking control signals; and the letter V the recording region of the video signals. Moreover, the hatched region corresponds to the redundant period $\tau$.

To prevent the video signals from being recorded in the overlap region Q, the head switching signal may be fed to the circuit 53a, as shown by the paths of the broken lines in FIG. 6, to alternately switch the video signals from the circuit 100a in response to the head switching signal thereby to alternately feed them to heads 44a and 44b to prevent recording in the overlap region Q can be easily achieved.

The embodiments of FIGS. 6 to 11 described correspond to the case in which the video signals to be recorded are used in such television systems as NTSC, PAL, and SECAM. However, the present invention is not limited thereto but can be applied to a television system having a different number of scanning lines than the aforementioned systems, e.g., a high-quality television system having 1125 horizontal scanning lines. Moreover, the present invention is embodied such that the synchronism data for the video signals are exemplified by the horizontal synchronism data, (i.e., the horizontal synchronism signals and the burst signals), as the horizontal scanning unit in the prior art and the vertical synchronism data, i.e., the vertical synchronism signals, as the vertical scanning unit, but it is not limited thereto. As shown in FIG. 15a, for example, the present invention can be applied to a case in which the synchronism signals of the prior art are replaced by such synchronism data, e.g., horizontal synchronizing signals HX of negative polarity and burst signals BX of positive polarity, multiplexed separately in the region of horizontal blanking period $T_B$. The present invention can also be applied to the cases, in which the luminance signal Y and the chrominance signal C are time-divided and multiplexed by assigning one set of horizontal synchronism data, e.g., the horizontal synchronizing signals HX and the burst signals BX, to the one horizontal scanning period $T_H$, as shown in FIG. 15a; in which one set of the horizontal synchronism data (HX and BX) are assigned to a plurality, e.g., two, of horizontal scans, as shown in FIG. 15b; in which not the horizontal synchronizing signals HX, but only the burst signals BX are assigned as the horizontal synchronism data, as shown in FIG. 15c; in which the vertical synchronism data are assigned not for each field period, as in the foregoing embodiments, but for each frame period, although not shown; and in which only the vertical blanking period is involved, but the vertical synchronism data are not assigned. In any case, the desired redundant period can be established to achieve the object of the present invention by conducting the time axis transformations on the basis of the horizontal synchronism data contained in the aforementioned respective video signals.

Moreover, the present invention enables attainment of the effect of elongating the redundant period $\tau$, as is expressed by the foregoing equation (6), by making the frequency ($f_1$) of the write clock pulses $Q_1$ and the frequency ($f_2$) of the read clock pulses $Q_2$ different such that $f_1 < f_2$. More specifically, $m/k > 1$ in the foregoing equation (5). Other objects can be attained according to the present invention. More specifically, for $f_1 < f_2$, the horizontal scanning period $T_H'$ of the recorded video signals having their time axis transformed by the circuit 100a has a relation to the horizontal scanning period $T_H$ of the original video signals as is expressed by $T_H' < T_H$. In short, the time axis of the recorded video signals is compressed. In other words, the time axis is lengthened by the time axis transforming unit 100b. Thus, according to the present invention, there can be attained an effect with the compression and elongation of the time axis of the video signals easily realized without any increase in circuit scale. Especially for the high-quality MUSE system disclosed in the aforementioned papers, and as is partially proposed as the high-quality television system, there can be attained another effect so that segment recording can be facilitated by time axis compression and expansion.

In the high-quality MUSE system, horizontal synchronism signals HD of the so-called positive polarity having a n amplitude not exceeding the maximum amplitude of the video signals are used as the horizontal synchronism data, as shown in FIG. 1 15d, and vertical synchronism signals FP of the so-called polarity are used as the vertical synchronism data, although not shown. When video signals of such a signal type are to be recorded, the time-axis transforming unit 100a compresses the time axis of the original video signals (as shown in FIG. 15d) in advance, as shown in FIG. 15a, to suitably generate and insert horizontal synchronizing signals HX of negative polarity having a level exceeding the maximum amplitude of the video signals, burst signals BX of positive polarity, and/or vertical synchronism data VX of negative polarity, although not shown, to the video blanking period ($T_B$, as shown in FIG. 15a) obtained as a result of the compression. Upon the reproduction of the video signals, the original video signals (as shown in FIG. 15d) can be restored by expanding the reproduced video signals (as shown in FIG. 15a) to restore the original time axis by unit 100b by suitably eliminating the synchronism data HX, BX and VX. When these synchronism data HX, BX and VX are generated, the output pulses from the decoder 405 of FIG. 10, for example, are generate ad at a timing corresponding to the blanking period $T_B$. As a result, the output pulses from said decoder 405 can be suitable delayed to generate the desired synchronism signals HX. On the basis of these synchronism signals HX, moreover, the clocks from the terminal 420 can be subjected to suitable frequency division to generate the burst signals BX having a predetermined frequency and a predetermined cycle number. Since the output pulses (as shown in FIG. 7k) from the aforementioned circuit 410 are positioned for the vertical blanking period $\tau_B$, the desired vertical synchronism data VX can be generated on the basis of the output from said circuit 410 or on the basis of the vertical synchronism data VS, which are obtained from the circuit 140 by separating the vertical synchronism signals FP of positive polarity from the original video signals. The desired recorded video signals (as shown in FIG. 15a) can be obtained by supplying and inserting the synchronism data HX, BX and VS thus generated to the circuit 104.

Even in the case of the high-quality television system having synchronism data of positive polarity which are difficult to separate when they are to be reproduced by the segment recording, with the recording method of the present invention described, synchronous separation can be facilitated to completely eliminate skew, which is caused by the segment recording, thereby to correctly restore stable video signals having no time-axis fluctuation. This makes it possible to easily realize segment recording even in the high-quality television system.

The embodiments described correspond to the case in which the present invention is applied to the two-head type helical scanning VTR to conduct four-segment recording. However, the present invention is not limited thereto; the invention being essentially the same if the number of heads is one or more and if the number of the segments is two or more.

As has been described herein, according to the present invention, it is possible to provide a magnetic recording and reproducing apparatus which is able to eliminate skew and time-axis fluctuations and to effect excellent and stable segment recording and reproduction of video signals. Moreover, the segment recording can be realized even for video signals having positive synchronism signals, as is partially proposed in the high-quality television system, and the recording density of the tape can be increased. Thus, the improvement in the recording density and the longer recording time can easily be made better than those of the digital recording systems of the prior art. Therefore, the present invention can have additional effects that the cost, performance and reliability of the apparatus can be remarkably improved together with interchangeability.

We claim:

1. A method for recording video signals in a rotary head helical scan type magnetic recording system, comprising the steps of:
   dividing a video signal for one vertical scanning period into n blocks,
   transforming the time axis of said divided blocks by inserting a redundant period between said divided blocks, and
   recording said transformed divided blocks consecutively onto a recording medium with each of said transformed divided blocks being recorded on different oblique tracks of said medium and a recording start point of each of said oblique tracks appearing at the center of said redundant period.

2. A recording method for processing video signals containing audio signals occurring during vertical blanking periods, for recording in a rotary head helical scan type magnetic recording system, comprising the steps of:
   eliminating the audio signals from said vertical blanking periods,
   thereafter dividing the video signal for one vertical scanning period into n blocks, each of said blocks containing less than N/n horizontal scanning lines, where N is the number of the horizontal scanning lines in one vertical scanning period,
   transforming a time axis of said divided blocks by inserting a redundant period between said divided blocks,
   recording said transformed divided blocks onto a recording medium with each of said transformed divided blocks being recorded on different oblique tracks and with a recording start point for each of said oblique tracks appearing within said redundant period, and setting the width of said redundant period equal to one horizontal period.

3. An apparatus for recording an input video signal in a rotary head helical scan type magnetic recording system, comprising:
   rotary means including rotary heads for recording the input video signal on a magnetic medium,
   means for detecting rotations of said rotary heads,
   means for dividing the input video signal of one vertical scanning period into n blocks,
   means for transforming the time axis of said video signal blocks by inserting a redundant period between said video signal blocks, in response to an output signal of said detecting means, to provide transformed divided blocks, and
   means for supplying said transformed divided blocks to said rotary heads consecutively so that each of said transformed divided blocks is recorded on different oblique tracks with a recording start point for each of said oblique tracks within said redundant period.

4. A recording apparatus according to claim 3, further comprising means for causing a constant potential to be recorded on said magnetic medium during each of said redundant periods.

5. An apparatus for reproducing said input video signal according to claim 3, further comprising:
   means for controlling said rotary means to reproduce said transformed divided blocks recorded on said magnetic recording medium to provide series of reproduced transformed divided blocks,
   means for correcting time axis error is said series of reproduced transformed blocks to provide corrected series of the reproduced transformed divided blocks, and
   said transforming means transforms the time axis in said corrected series of the reproduced transformed divided blocks into a continuous output video signal.

6. An apparatus for recording an input video signal in a rotary head helical scan type magnetic recording system, comprising:
   means for rotating magnetic heads to record information on a magnetic medium;
   means for detecting rotations of said magnetic heads,
   means for generating pulses synchronizing with the output signal of said detecting means to provide synchronized pulses,
   means for converting the input video signal of one vertical scanning period into n blocks, with a redundant period occurring between said blocks, in response to said synchronized pulses, and
   means for consecutively supplying series of said blocks to the magnetic heads as said information with each of said blocks being recorded on different oblique tracks of said magnetic medium with a recording start point for each of said oblique tracks being positioned within said redundant period.

7. A recording apparatus according to claim 6, wherein each of said blocks has a number of horizontal scanning lines not greater than N/n, where N is the number of horizontal scanning lines in the field of the input video signal.

8. A recording apparatus according to claim 6, wherein said converting means comprises:
   means for storing the input video signal, means for writing the input video signal in said storing means in response to synchronization pulses contained in the input video signal, and means for reading the video signal from said storing means in response to said synchronized pulses.

9. A recording apparatus according to claim 8, further comprising:

means for generating a blanking signal having a selected level during said redundant periods.

10. A recording apparatus according to claim 8, wherein said writing means generates write clock pulses synchronized with said synchronization pulses.

11. A recording apparatus according to claim 10, wherein said reading means generates read clock pulses having a frequency higher than the frequency of said write clock pulses.

12. A recording apparatus according to claim 11, wherein said reading means generates a recording start pulse synchronized with said synchronized pulses.

13. A method for recording video signals in a rotary head helical scan type magnetic recording system having overlap regions in which plural rotary heads simultaneously face a recording medium, comprising the steps of:

dividing a video signal for one vertical scanning period into n blocks;

transforming the time base of said divided blocks by inserting a redundant period between said divided blocks; and recording said transformed divided blocks consecutively onto said recording medium with each of said transformed divided blocks being recorded on different oblique tracks of said medium and said redundant period being included in one of said overlap regions.

14. A method according to claim 13, wherein constant level signal is recorded during said redundant period.

15. A method according to claim 13, wherein a synchronization information signal is recorded during said redundant period.

16. A method according to claim 13, further comprising the step of:

setting the width of said redundant period equal to one horizontal period of said transformed divided blocks.

17. A method according to claim 13, further comprising the step of:

modulating said transformed divided blocks into a frequency modulated signal prior to said recording step.

18. A method according to claim 13, wherein a vertical synchronization information signal is recorded just after said redundant period during each vertical scanning period.

19. A method according to claim 13, further comprising:

reproducing said transformed divided blocks consecutively from said recording medium by the plural rotary heads;

switching said reproduced transformed divided blocks delivered from the plural rotary heads during each said redundant period to provide consecutive video signal blocks; and transforming the time base of said switched consecutive video signal blocks to get a continuous video signal.

20. A method according to claim 19, wherein said transforming step includes the steps of correcting a time base error of said consecutive video signal blocks and eliminating said redundant period from said consecutive video signal.

21. A method for reproducing a video signal in a rotary head helical scan type magnetic reproducing system having overlap regions in which plural rotary heads simultaneously face a recording medium, comprising the steps of:

reproducing video signal blocks consecutively from oblique tracks of the magnetic recording medium by the plural rotary heads; each of said blocks having been recorded on different ones of said oblique tracks, wherein the video signal of one vertical scanning period is divided into n, and a redundant period has been formed between adjacent ones of said video signal blocks, said redundant period having been positioned in one of said overlap regions;

switching said reproduced video signal blocks delivered from the plural rotary heads during said redundant period; and transforming the time base of said switched reproduced video signal blocks to eliminate said redundant period.

22. A method according to claim 21, further comprising the step of converting said switched reproduced video signal blocks into digital video signal blocks prior to said transforming step.

23. A method according to claim 22, further comprising the step of converting said transformed series of said digital signal blocks into an analog video signal.

24. A method according to claim 23, further comprising the steps of:

reproducing a modulated audio signal recorded on said overlap regions of said magnetic recording medium;

demodulating said reproduced modulated audio signal into an output audio signal; and adding said output audio signal and said analog video signal.

25. A method according to claim 21, wherein said transforming step includes the steps of correcting a time base error of said switched reproduced video signal blocks and eliminating said redundant period.

26. An apparatus for recording an input video signal in a rotary head helical scan type magnetic recording system having overlap regions in which plural rotary heads simultaneously face a recording medium, comprising:

rotary means including said rotary heads for recording the input video signal on said recording medium;

means for dividing the input video signal of one vertical scanning period into n blocks, means for transforming the time base of said video signal blocks by inserting a redundant period between said video signal blocks to provide transformed divided blocks; and means for supplying said transformed divided blocks to said rotary heads consecutively whereby each of said transformed divided blocks is recorded on different oblique tracks with said redundant period being included in one of said overlap regions.

27. An apparatus according to claim 26, further comprising:

means for causing a constant potential to be recorded on said magnetic medium during each of said redundant periods.

28. An apparatus according to claim 26, further comprising:
   means for controlling said rotary means to reproduce said transformed divided blocks recorded on said magnetic recording medium to provide series of reproduced transformed divided blocks; and
   means for switching said reproduced transformed divided blocks provided from said rotary heads during said redundant period, wherein said transforming means transforms the time base of said switched reproduced divided blocks into a continuous output video signal.

29. An apparatus according to claim 26, further comprising:
   means for detecting rotation angles of said rotary heads, wherein said transforming means transforms the time base of said video signal blocks in response to the output signal of said detecting means so that said redundant period is recorded in a predetermined section of said overlap regions.

30. An apparatus according to claim 29, wherein said transforming means transforms the time base of said video signal blocks in response to the output signal of said detecting means so that starting points of horizontal scanning lines of adjacent oblique tracks are recorded so as to coincide in a direction perpendicular to the track direction.

31. An apparatus for recording an input video signal in a rotary head helical scan type magnetic recording system having overlap regions in which plural rotary heads simultaneously face a recording medium, comprising:
   means for rotating magnetic heads to record information on said magnetic medium;
   means for detecting rotations of said magnetic heads;
   means for generating pulses synchronized with the output signal of said detecting means to provide synchronized pulses;
   means for converting the input video signal of one vertical scanning period into n blocks, with a redundant period occurring between said blocks, in response to said synchronized pulses; and
   means for consecutively supplying series of said blocks to the magnetic heads as said information with each of said blocks being recorded on different oblique tracks of said magnetic medium with said redundant period being included in one of said overlap regions.

32. An apparatus according to claim 31, wherein each of said blocks has a number of horizontal scanning lines not greater than N/n, where N is the number of horizontal scanning lines in the field of the input video signal.

33. An apparatus according to claim 34, wherein said converting means includes:
   means for storing the input video signal,
   means for writing the input video signal in said storing means in response to synchronization pulses contained in the input video signal; and
   means for reading the video signal from said storing means in response to said synchronized pulses.

34. An apparatus according to claim 33, further comprising:
   means for generating a synchronization information signal and a blanking signal having a selected level during said redundant period.

35. An apparatus according to claim 33, wherein said writing means generates write clock pulses synchronized with said synchronization pulses.

36. An apparatus according to claim 35, wherein said reading means generates read clock pulses having a frequency higher than the frequency of said write clock pulses.

37. An apparatus according to claim 36, wherein said reading means generates a recording start pulse synchronized with said synchronized pulses.

38. An apparatus for reproducing a video signal in a rotary head helical scan type magnetic reproducing system having overlap regions in which plural rotary heads simultaneously face a recording medium, comprising:
   means for rotating magnetic heads to reproduce information from the magnetic medium, said information including series of video signal blocks, each of said video signal blocks being recorded on different oblique tracks of said magnetic medium wherein the video signal of one vertical scanning period is divided into n video signal blocks, each of said video signal blocks including a plurality of horizontal scanning lines and a redundant period formed between adjacent ones of said video signal blocks, said redundant period being included in one of said overlap regions;
   means for separating synchronization information signals from said reproduced information; and
   means for transforming a time base of said reproduced information in response to the output of said separating means into an output video signal.

39. An apparatus according to claim 38, wherein said transforming means including means correcting a time base error of said reproduced information in response to the output of said separating means, and means for converting the output of said correcting means into an output video signal.

40. An apparatus according to claim 38, wherein said transforming means comprises:
   means for storing said reproduced information;
   means for writing said reproduced information in said storing means in response to said synchronization information signal;
   means for generating reference pulses; and
   means for reading said reproduced information from said storing means in response to said reference pulses.

41. An apparatus according to claim 40, wherein said writing means generate write clock pulses synchronized with said synchronization information signal.

42. A method for processing video signals containing audio signals occurring during vertical blanking periods of the video signals for use in recording in a rotary head helical scan type magnetic recording system having overlap regions in which plural rotary heads simultaneously face a recording medium, comprising the steps of:
   separating the audio signals from said vertical blanking periods of the video signals;
   thereafter recording said separated audio signals onto the recording medium, said separated audio signals being recorded during said overlap regions;

dividing said video signals, from which the audio signals are separated, for one vertical scanning period into n blocks;

transforming the time base of said divided blocks by inserting a redundant period between said divided blocks; and recording said transformed divided blocks consecutively onto said recording medium with each of said transformed divided blocks being recorded on different oblique tracks of said medium, said redundant period being included in one of said overlap regions.

43. A method according to claim 42, further comprising the step of:

recording a constant level signal during said redundant period.

44. A method according to claim 43, further comprising the step of:

recording a synchronization information signal in said redundant period.

45. A method according to claim 42, further comprising the steps of:

processing said separated audio signals into a modulated audio signal prior to said recording step, wherein said modulated audio signal is recorded onto an extension section of said oblique track on which each of said transformed divided blocks is recorded.

46. A method according to claim 45, wherein said processing step includes the step of transforming a time base of said separated audio signals.

47. A method according to claim 42, further comprising the step of:

converting the video signals, from which the audio signals are separated, into digital signals prior to said dividing step.

48. A method according to claim 47, further comprising the step of:

converting said transformed divided blocks to analog signal blocks after said transforming step.

49. An apparatus for recording an input video signal in a rotary head helical scan type magnetic recording system using a plurality of rotary magnetic heads, in which the rotary magnetic heads simultaneously trace overlap regions of both sides of oblique tracks on a magnetic tape, comprising:

first transforming means for transforming said input video signal of one vertical scanning period thereof into transformed divided blocks, a number of said transformed divided blocks being n, and redundant periods being formed between consecutive ones of said transformed divided blocks; and means for supplying each of said transformed divided blocks to each of the rotary magnetic heads consecutively whereby each of said transformed divided blocks is recorded on each of the oblique tracks and each of said redundant periods is recorded on each of said overlap regions.

50. An apparatus according to claim 49, further comprising:

means for recording a synchronization information signal and a blanking signal having a selected level during said redundant periods.

51. An apparatus according to claim 49, further comprising:

means for reproducing said transformed divided blocks with said redundant periods recorded on said oblique tracks by said rotary magnetic heads to provide series of reproduced transformed divided blocks;

means for switching said reproduced transformed divided blocks during said redundant periods; and second transforming means for transforming a time base of said switched reproduced transformed divided blocks into a continuous output video signal.

52. An apparatus according to claim 51, wherein said second transforming means includes means for correcting a time base error of said switched reproduced transformed divided blocks and means for converting the output of said correcting means into said continuous output video signal.

53. An apparatus according to claim 51, further comprising:

means for detecting rotation phase of said rotary magnetic head, wherein said first transforming means transforms said input video signal in response to the output signal of said detecting means so that said redundant period is recorded in a predetermined portion of said overlap regions.

54. An apparatus according to claim 53, further comprising:

means for generating reference pulses, wherein said second transforming means transforms said time base of said switched reproduced transformed divided blocks in response to said reference pulses so that a time base error of said switched reproduced transformed divided blocks is corrected.

55. An apparatus according to claim 51, wherein said first transforming means and said second transforming means include common memory means for storing said input video signal or said switched reproduced transformed divided blocks.

56. An apparatus according to claim 55, wherein said first transforming means and said second transforming means include common means for writing said input video signal or said switched reproduced transformed divided blocks into said common memory means in response to synchronization pulses.

57. An apparatus according to claim 56, wherein said first transforming means and said second transforming means include common means for reading said input video signal or said switched reproduced transformed divided blocks from said common memory means to provide said transformed divided blocks or said continue output video signal.

* * * * *